United States Patent
Carcouet et al.

(10) Patent No.: US 8,164,874 B2
(45) Date of Patent: Apr. 24, 2012

(54) OVERVOLTAGE PROTECTION DEVICE FOR AN ELECTRICAL CIRCUIT

(75) Inventors: Sebastien Carcouet, Vif (FR); Didier Leonard, Seyssinet-Pariset (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 192 days.

(21) Appl. No.: 12/468,534

(22) Filed: May 19, 2009

(65) Prior Publication Data
US 2009/0290276 A1 Nov. 26, 2009

(30) Foreign Application Priority Data
May 20, 2008 (FR) ...................................... 08 53252

(51) Int. Cl.
*H02H 9/02* (2006.01)
(52) U.S. Cl. ...................................................... 361/93.9
(58) Field of Classification Search ................... 361/93.9
See application file for complete search history.

(56) References Cited

U.S. PATENT DOCUMENTS

| | | | |
|---|---|---|---|
| 6,343,871 B1 * | 2/2002 | Yu | 362/249.03 |
| 6,529,355 B1 | 3/2003 | Becker et al. | |
| 7,791,855 B2 * | 9/2010 | Carcouet et al. | 361/117 |
| 2004/0169981 A1 * | 9/2004 | Werback et al. | 361/93.9 |
| 2006/0285264 A1 * | 12/2006 | Harris | 361/58 |
| 2009/0184747 A1 * | 7/2009 | Honda | 327/430 |

FOREIGN PATENT DOCUMENTS
JP 2002-325355 11/2002
WO WO 2006/129005 A2 12/2006

OTHER PUBLICATIONS
U.S. Appl. No. 12/468,373, filed May 19, 2009, Carcouet, et al.

\* cited by examiner

*Primary Examiner* — Rexford N Barnie
*Assistant Examiner* — Ann Hoang
(74) *Attorney, Agent, or Firm* — Oblon, Spivak, McClelland, Maier & Neustadt, L.L.P.

(57) ABSTRACT

An overvoltage protection device, including: an input configured to be connected to a power supply mains; an output configured to be connected to an electronic system to be protected; two bidirectional field-effect semiconductor transistors of normally-on type, connected in series between the input and the output, fabricated in a wide-bandgap material and configured to operate in current-limiting mode; and a resistor connected in parallel with the two transistors.

11 Claims, 1 Drawing Sheet

OVERVOLTAGE PROTECTION DEVICE FOR AN ELECTRICAL CIRCUIT

FIELD

The present invention relates to a device for protecting an electronic system from the overvoltages appearing on the supply mains.

BACKGROUND

Document WO 2006/129005 discloses a device for protection against the overvoltages generated by the supply mains. This device comprises, in particular, two field-effect transistors (FETs) connected in series and capable of limiting the current when this becomes greater than their current limit. However, when an overvoltage is caused by the switching of inductive or capacitive loads present on the supply mains, a large voltage variation may appear at each switching operation. Since the output voltage of the device of the prior art is fixed by parallel limiting means of the transil diode type, all the rest of the overvoltage is applied to the junction field-effect transistors (JFETs). The inductive current generated during the switching overvoltage may then be much higher than the current limit of the JFETs. In this case, the voltage across the terminals of the system increases greatly, until a transistor goes into avalanche mode and therefore no longer limits the current. The energy dissipated in the transistor is then considerable and may result in destruction of the components.

SUMMARY

The object of the invention is to provide a device for protecting an electronic system which is able to be effective against the various types of overvoltage appearing on a supply mains, whether these be induced by lightning strikes or by load switching operations on the mains, and which allows non-destructive energy dissipation during an overvoltage and very low dissipation during nominal operation.

This object is achieved by an overvoltage protection device, comprising an input intended to be connected to a power supply mains, and an output intended to be connected to an electronic system to be protected, characterized in that it comprises:

two bidirectional field-effect semiconductor transistors of normally-on type, connected in series between the input and the output, these being fabricated in a wide-bandgap material and able to operate in current-limiting mode; and a resistor connected in parallel with the two transistors The device of the invention is particularly suitable for protecting any electronic system connected to the power distribution mains.

The device of the invention is particularly suitable for providing effective protection of a capacitive power supply system. This is because, for this particular type of apparatus drawing a very small amount of power from the supply mains, the invention not only makes it possible to miniaturize the overvoltage protection but also to considerably improve the energy efficiency and therefore to reduce the thermal dissipation.

According to one feature, the two semiconductor transistors of the device are JFET transistors.

According to another feature, the semiconductor transistors of the device are connected back to back, in such a way that the drain of a first semiconductor transistor is connected to the supply mains, the drain of a second semiconductor transistor is connected to the electronic system to be protected, located downstream, the sources of the semiconductor transistors are connected together, and the gates of the two semiconductor transistors are also connected together and each is looped back onto the common potential of the sources.

According to another feature, the two semiconductor transistors of the device are fabricated in silicon carbide or in gallium nitride.

According to another feature, the device includes a bidirectional transit diode or a varistor connected downstream of the two semiconductor transistors in parallel with the output.

The invention also relates to an electronic system to be protected, which has a positive terminal and a negative terminal that are intended to be connected to a power supply mains, this system including as input a protection device as defined below, said device being connected in series to its positive terminal or its negative terminal.

According to one feature, the system consists of a power supply system that includes a rectifier module, for generating a DC voltage on a DC bus, and a bus capacitor connected between a positive line and a negative line of the DC bus.

According to another feature, the power supply system includes an input capacitor connected in series between the positive or negative terminal, downstream of the protection device.

BRIEF DESCRIPTION OF THE DRAWINGS

Other features and advantages will become apparent from the following detailed description, referring to an embodiment given by way of example and illustrated by the appended drawings in which.

DESCRIPTION OF PREFERRED EMBODIMENTS

In the rest of the description, it should be understood that the protection device 2 is suitable for protecting any type of electronic system 3 connected to an AC power supply mains A and thus capable of withstanding various types of perturbations coming from this mains A. As an example, the electronic system 3 to be protected may be a capacitive power supply system 30.

Figure 1:
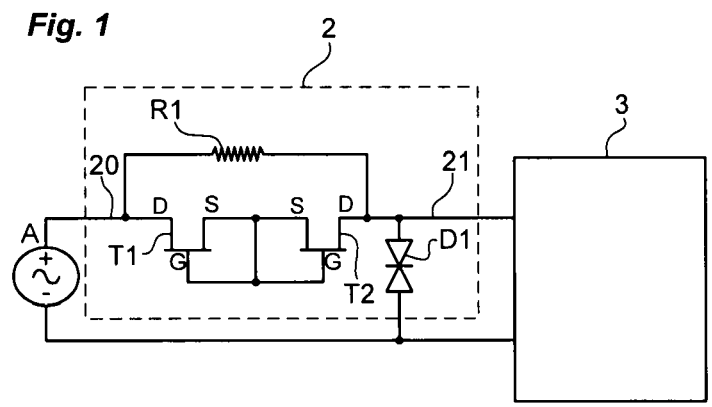
FIG. 1 shows a protection device of the invention, suitable for any electronic system connected to the power distribution mains.

The protection device 2 of the invention shown in FIG. 1 comprises an input 20, intended to be connected to a positive or negative terminal of a power supply mains A, and an output 21 intended to be connected to an electronic system 3 to be protected. Between the input 20 and the output 21, the protection device 2 comprises two, for example identical, bidirectional field-effect semiconductor transistors T1 and T2. The two semiconductor transistors T1, T2 are mounted in series and connected up as a current limiter. These semiconductor transistors T1, T2 are produced from a wide-bandgap material, such as for example silicon carbide (SiC) or gallium nitride (GaN), thereby giving them a low on-state resistance $R_{DS,on}$ and the capability of withstanding high voltages (above 1000 V).

These field-effect semiconductor transistors T1, T2 are preferably JFET transistors. A JFET transistor is a known semiconductor component that includes a control gate (G), the function of which is to allow or prevent a current from flowing between a drain (D) and a source (S). Such a transistor is said to be of the normally-on type if the drain-source path is conducting in the absence of the control voltage $V_{GS}$ between gate and source. Conversely, a JFET transistor is said to be of the normally-off type if the drain-source path is not conducting in the absence of voltage $V_{GS}$ between gate and source. In the invention, the semiconductor transistors T1, T2 (hereafter called transistors) are of the normally-on type.

As shown in FIG. 1, the transistors T1, T2 are connected as a current limiter and are connected in series with the electronic system 3 to be protected, located downstream. They are connected back to back, in such a way that the drain (D) of the transistor T1 is connected to the supply mains A, the drain (D) of the transistor T2 is connected to the electronic system 3 to be protected, located downstream, the sources (S) of the transistors T1, T2 are connected together, and the gates (G) of the two transistors are also connected together and each is looped back onto the common potential of the sources (S).

According to the invention, to protect the electronic system 3 located downstream from the overvoltages due to lightning strikes on the supply mains, the protection device 2 of the invention includes a clipper of the varistor type or a bidirectional transil diode D1 connected downstream of the transistor T2 in parallel with the output 21. The combination of the two transistors T1, T2 and the clipper, formed by the diode D1 in FIG. 1, enables the electrical circuit 3 located downstream to be protected from highly energetic overvoltages without the volume of the device being excessively large. The objective of the transil diode D1 is to fix the maximum voltage at the output of the device and to provide a preferential path for the current flowing during an overvoltage. It is conceivable to omit this transil diode D1 if the bus capacitor Cb has a capacitance such that the voltage increase generated across its terminals during an overvoltage does not exceed the maximum voltage admissible by the electronic system 3 connected downstream.

The operation in current-limiting mode performed by the JFET transistors considerably reduces, through their principle, the current caused by the overvoltage and therefore consequently reduces the energy absorbed by the protection device compared with a conventional device. Depending on the magnitude of the overvoltage, the remaining energy to be dissipated is distributed between the transil diode D1 and the two series-connected transistors T1, T2. Until an overvoltage close to the tripping voltage of the transil diode D1 is reached, most of the energy is dissipated in the transit. For higher overvoltages, the transistors T1 and T2 take over in dissipating the additional energy.

The current limit of each transistor T1, T2 is chosen in such a way as to be able to deliver the start current necessary for the load of the electronic system 3. To optimize the lightning overvoltage protection, the current limit is reduced to the minimum required for proper operation of the load, so as to reduce the energy to be dissipated in the event of an overvoltage, whether this dissipation is in each transistor T1, T2 or in the transit diode D1. However, when the overvoltage is caused by the switching of inductive or capacitive loads present on the supply mains A, a large voltage variation appears at each switching operation. Since the output voltage of the device of the invention is fixed by the transit diode D1, all the rest of the overvoltage is applied to the transistors T1, T2. The inductive current generated during the switching overvoltage may then be much higher than the current limit of the transistors T1, T2. In this case, the voltage across the terminals of the device 2 greatly increases until a transistor T1, T2 goes into avalanche mode and therefore no longer limits the current. The energy dissipated in this transistor is therefore considerable and may lead to the destruction of its components.

To solve the problem of switching overvoltages, it is possible to design the transistors T1, T2 appropriately for them to be able to withstand the maximum energy. However, this solution is particularly expensive. Alternatively, it is possible to place a correctly sized resistor R1 in parallel with the two JFET transistors so as to be able to dissipate therein all the energy generated by the switching overvoltages. In this alternative, each transistor T1, T2 may therefore remain of modest dimensions and of reasonable cost. The resistor R1 connected in parallel must therefore be sized so as to limit the voltage to below the maximum voltage withstood by the transistors T1, T2.

It should be noted that the current limiting feature of JFET transistors depends on the temperature. As the voltage rises during the overvoltage, dissipation is firstly observed in the transit diode D1, then in the transistors T1, T2, which results in the transistors being progressively heated and therefore in the limit current level being lowered. When a lightning-induced overvoltage occurs, this heating effect is favourable in that it makes it possible to limit the energy to be dissipated, since the current in the JFETs and in the transit diode is itself limited. In contrast, in the presence of a switching overvoltage and an inductive current, the current can no longer flow through the JFETs, resulting in a rapid rise in the voltage up to the avalanche threshold of the JFETs, above which the current can flow through the JFET transistors without any limitation. According to the invention, the resistor R1 connected in parallel with the JFETs therefore constitutes a path borrowed by the inductive current as soon as the equation below is satisfied:

$$U_{max}=(I_{max}-I_{limJFET})R1.$$

Thus, depending on the maximum value of Imax (inductive current), it is possible to define a resistor R1 such that $U_{max}$ is less than $U_{brJFET}$, so as to prevent the JFETs from going into avalanche mode. The temperature sensitivity of the JFETs therefore makes it possible to promote energy dissipation transfer to the resistor R1, thereby improving the robustness of the device.

Design example:
Inductive load on the 300 VA mains with $I_{max}$=1.8 A;
Current limit of a JFET transistor: $I_{limJFET}$=0.1 A;
Maximum withstand voltage of a JFET transistor: $U_{brJFET}$=2000 V,
giving a value of R1=$U_{brJFET}/(I_{max}-I_{limJFET})$=1176 ohms.

Figure 2:
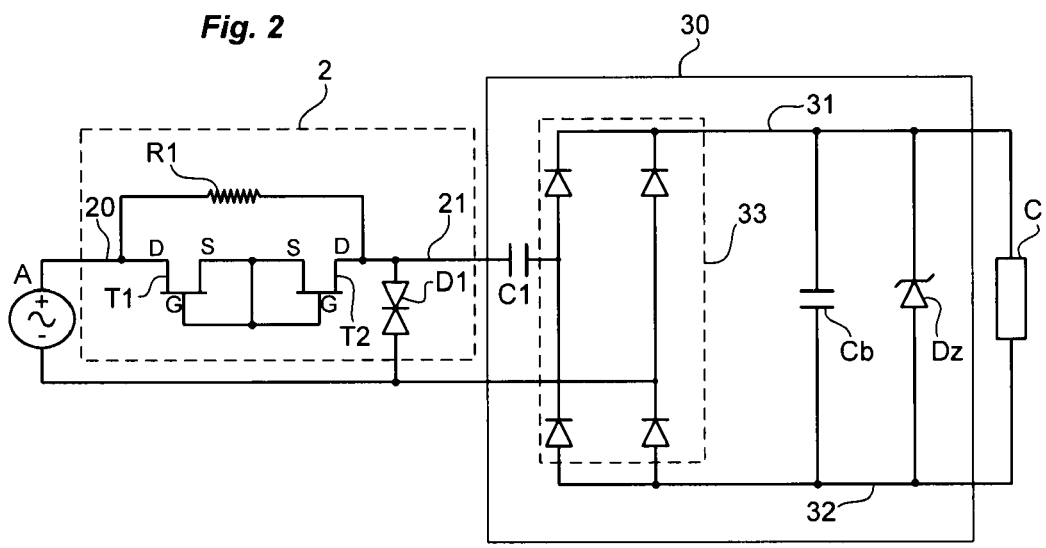
FIG. 2 shows a protection device of the invention suitable for a capacitive power supply system.

Referring to FIG. 2, the electronic system 3 to be protected is for example a power supply system 30 intended for supplying an electrical load C. Such a power supply system 30 comprises two input terminals—a positive terminal and a negative terminal—which are intended to be connected to a supply mains A applying an AC voltage, for example equal to 230 VAC or 400 VAC, generated at a frequency of for example 50 Hz. The system furthermore includes, as input, a rectifier module 33 consisting for example of a diode bridge for generating, on a DC bus, a DC voltage from the AC voltage of the supply mains A, a bus capacitor Cb connected between a positive line 31 and a negative line 32 of the bus, downstream of the rectifier module 33, and an input capacitor C1 connected, on one side, to the positive terminal and, on the other side, to one branch of the diode bridge. The system 30 may also include means for limiting the voltage delivered by the power supply system, consisting for example of a Zener diode Dz connected between the positive line 31 and the negative line 32 of the bus, downstream of the bus capacitor Cb.

In FIG. 2, the protection device 2 of the invention is thus mounted upstream of the capacitive power supply system described above. The device 2 provides protection against the various types of overvoltage that the supply system may experience, especially lightning-induced overvoltages or overvoltages due to the switching of loads present on the power supply mains A. This device also has the advantage of protecting the power supply system 30 from the overcurrents appearing when voltage is applied, by limiting the start-up current. What happens is that, on starting the power supply system, the large voltage variation seen by the input capacitor C1 results in a high current inrush through the two transistors T1, T2. When the current increases and becomes greater than the current limit of the transistor T1, the transistor T1 switches to its limiting mode, causing its internal resistance to increase. As the resistance of the transistor increases, the voltage across its terminals increases. The same applies in the case of the transistor T2. Thus, the large voltage variation occurring at start-up is absorbed by the transistors. In the normal operation, the on-state resistances of the two transistors T1, T2 are very low, thereby generating only low dissipation losses.

Of course, other alternative embodiments and detailed improvements are conceivable, without departing from the scope of the invention and use of equivalent means may even be envisaged.

The invention claimed is:

1. An overvoltage protection device, comprising:
    an input configured to be connected to a first terminal of a power supply mains;
    an output configured to be connected to an electronic system to be protected;
    first and second bidirectional JFET field-effect semiconductor transistors of normally-on type, connected in series between the input and the output, fabricated in a wide-bandgap material and configured to operate in current-limiting mode;
    a resistor connected in parallel with the two transistors, wherein the resistor has a resistance value at least equal to $$U_{brJFET}/(I_{max}-I_{limJFET}),$$

in which $U_{brJFET}$ is a maximum withstand voltage of the JFET field-effect semiconductor transistors,
    Imax is inductive current in the overvoltage protection device, and
    $I_{limJFET}$ is a current limit of the JFET field-effect semiconductor transistors;
    and further comprising a bidirectional transil diode or a varistor connected at a first end to a point downstream of the first and second semiconductor transistors in parallel with the output, and directly connected at a second end, opposite to the first end, to a second terminal of the power supply mains,
    and wherein the resistor is connected between the drain of the first semiconductor transistor and the bidirectional transil diode or the varistor.

2. A device according to claim 1, wherein the semiconductor transistors are connected back to back, such that a drain of the first semiconductor transistor is to be connected to the input, a drain of the second semiconductor transistor is connected to the output, sources of the semiconductor transistors are connected together, and gates of the first and second semiconductor transistors are also connected together and each is looped back onto a common potential of the sources.

3. A device according to claim 1, wherein the first and second semiconductor transistors are fabricated in silicon carbide or in gallium nitride.

4. An electronic system to be protected, comprising:
    a positive terminal and a negative terminal configured to be connected to a power supply mains; and
    an input protection device as defined in claim 1 connected in series to the positive terminal or the negative terminal.

5. A system according to claim 4, further comprising a power supply system connected to the input protection device and that includes a rectifier module, for generating a DC voltage on a DC bus, and a bus capacitor connected between a positive line and a negative line of the DC bus.

6. A system according to claim 4, wherein the power supply system includes an input capacitor connected in series between the input protection device and the positive or negative terminal, downstream of the protection device.

7. An overvoltage protection device, comprising:
    an input configured to be connected to a first terminal of a power supply mains;
    an output configured to be connected to an electronic system to be protected;
    first and second bidirectional JFET field-effect semiconductor transistors of normally-on type, connected in series between the input and the output, fabricated in a wide-bandgap material and configured to operate in current-limiting mode;
    a resistor connected in parallel with the two transistors, wherein the resistor has a resistance value at least equal to $$U_{brJFET}/(I_{max}-I_{limJFET}),$$

in which $U_{brJFET}$ is a maximum withstand voltage of the JFET field-effect semiconductor transistors,
    Imax is inductive current in the overvoltage protection device, and
    $I_{limJFET}$ is a current limit of the JFET field-effect semiconductor transistors;
    wherein the semiconductor transistors are connected back to back, such that a drain of the first semiconductor transistor is to be connected to the input, a drain of the second semiconductor transistor is connected to the output, sources of the semiconductor transistors are directly connected together, and gates of the first and second semiconductor transistors are also connected together and each is looped back onto a common potential of the sources,
    and further comprising a bidirectional transil diode or a varistor connected at a first end to a point downstream of the first and second semiconductor transistors in parallel with the output, and directly connected at a second end, opposite to the first end, to a second terminal of the power supply mains,
    and wherein the resistor is connected between the drain of the first semiconductor transistor and the bidirectional transil diode or the varistor.

8. A device according to claim 7, wherein the first and second semiconductor transistors are fabricated in silicon carbide or in gallium nitride.

9. An electronic system to be protected, comprising:
    a positive terminal and a negative terminal configured to be connected to a power supply mains; and
    protection device as defined in claim 7 connected in series to the positive terminal or the negative terminal.

10. A system according to claim 9, further comprising a power supply system connected to the input protection device and that includes a rectifier module, for generating a DC voltage on a DC bus, and a bus capacitor connected between a positive line and a negative line of the DC bus.

11. A system according to claim 9, wherein the power supply system includes an input capacitor connected in series between the input protection device and the positive or negative terminal, downstream of the protection device.

* * * * *